United States Patent [19]

Tucker, deceased et al.

[11] 4,352,655
[45] Oct. 5, 1982

[54] ENGINE

[75] Inventors: Winston B. Tucker, deceased, late of Seattle, Wash., by Mary L. Tucker, administratrix; Edward L. Tucker, 626 NW. 49th St., Seattle, Wash. 98107

[73] Assignees: Willmot A. Tucker; Edward Tucker, both of Seattle, Wash.

[21] Appl. No.: 82,036

[22] Filed: Oct. 5, 1979

[51] Int. Cl.³ .............................................. F23C 11/04
[52] U.S. Cl. ........................................ 431/1; 431/356; 60/729; 123/46 R; 123/48 AA; 123/188 B; 137/529; 137/539
[58] Field of Search .................... 431/356, 1; 60/39.12, 60/729, 597; 123/46 R, 48 AA, 51 B, 188 B, 39; 137/529, 539

[56] References Cited

U.S. PATENT DOCUMENTS

| 862,653 | 8/1907 | Pedrick et al. | 123/46 |
|---|---|---|---|
| 1,076,283 | 10/1913 | Heany | 123/46 |
| 1,314,801 | 9/1919 | Hanzlik | 123/46 |
| 1,920,765 | 8/1933 | Rasch | 123/46 |
| 2,163,597 | 6/1939 | Grove | 137/489.5 |
| 3,017,897 | 1/1962 | Seguenot | 137/529 |
| 3,417,776 | 12/1968 | Ludovig | 137/539 |

Primary Examiner—Carroll B. Dority, Jr.
Assistant Examiner—Lee E. Barrett
Attorney, Agent, or Firm—Seed, Berry, Vernon & Baynham

[57] ABSTRACT

An improved engine comprises a primary piston and primary cylinder in which air and fuel is precombusted. The piston is reciprocated in the cylinder by an external prime mover. The exhaust of the precombusted air/fuel mixture is controlled by a floating exhaust valve piston which seats against the exhaust port and has its other end pressurized at a set pressure preferably by an inert gas. The precombusted air/fuel mixtures are exhausted to secondary combustion chambers where additional air, fuel and prime mover exhaust gases are added to increase the velocity and pressure of the gas and provide for more complete combustion of the fuel.

6 Claims, 10 Drawing Figures

ENGINE

BACKGROUND OF THE INVENTION

1. Field of the Invention

This invention pertains to devices such as those suited for combusting air/fuel mixtures for producing hot, high-pressure, high-velocity, low-pollution products of combustion. In addition, this invention pertains to a unique exhaust piston valve for controlling the exhaust pressure from a compressing device such as a compressor, an internal combustion engine or positive displacement rotary pump (i.e. twin or triple screw rotary lubrication oil pump).

2. Description of the Prior Art

Heretofore, internal combustion engines have incompletely combusted or precombusted and completely burned the air/fuel mixture totally within a closed cylinder. The completion of the combustion within the cylinder causes all the work to be performed on the piston and while this aids in movement of the piston, it decreases the kinetic energy of the products of combustion which exit from the cylinder. A few engines have attempted to power an additional external turbine using residual exhaust gases. The primary purpose of all these known engines, however, is to use the main combustion for powering the engine piston or rotor rather than the external turbine. These engines therefor require no power source of their own other than the energy derived from the fuel combustion.

As to the valve feature of this invention, in prior art devices which produce a compressed gaseous product such as air compressors or internal combustion engines, the exhaust pressure by which the products leave the compression chamber have usually been controlled by spring-biased valves or two-cycle exhaust ports cut into the main engine body cylinder wall. These valves have not been adequate.

SUMMARY OF THE INVENTION

This invention provides an apparatus for producing a high-pressure, high-velocity exhaust gas stream.

Basically, this object of the invention is obtained by providing at least one primary piston and primary cylinder in which an air/fuel mixture is introduced into the cylinder and leaves the cylinder through an exhaust port during ignition and burning. An external prime mover moves the piston to compress the air/fuel mixture which either self-ignites as in diesel, or can be ignited by a sparkplug depending on the fuel and compression ratios used. The dischage of the burning air/fuel mixture out of the cylinder is controlled by a unique floating exhaust piston valve. The valve seats against the exhaust port and is biased toward the exhaust port by an inert pressurized gas on its opposite end. The pressure of the inert gas can be regulated to adjust the valve pressure for various types of fuels. The precombusted air/gas mixture within the cylinder, when ignited, leaves the exhaust port by opening the floating exhaust valve. Then the burning gases are mixed with additional air and fuel (and exhaust gases if the prime mover is an internal combustion engine) at various downstream stations to increase the velocity and pressure of the gas stream and decrease pollutants. The gas stream can be used in its natural hot state for heating or can be used to drive a turbine. That is, either the heat of the final products of exhaust can be used to generate energy or the kinetic energy of the exhausting gas stream can be used to produce energy.

It is another object of this invention to provide a unique floating piston exhaust valve suitable for controlling the exhaust from any compression chamber. Basically this exhaust valve includes a piston having one end which seats against an exhaust port and an outer end which is exposed to an inert pressurized gas. The inert gas is externally controllable to determine the exhaust pressure by which the piston will move away from the exhaust port to allow the compressed gases to be exhausted. For example, for internal combustion engines the exhaust pressure setting on the valve may vary depending upon the type of fuel being burned.

DETAILED DESCRIPTION OF THE PREFERRED EMBODIMENT

Figure 1:
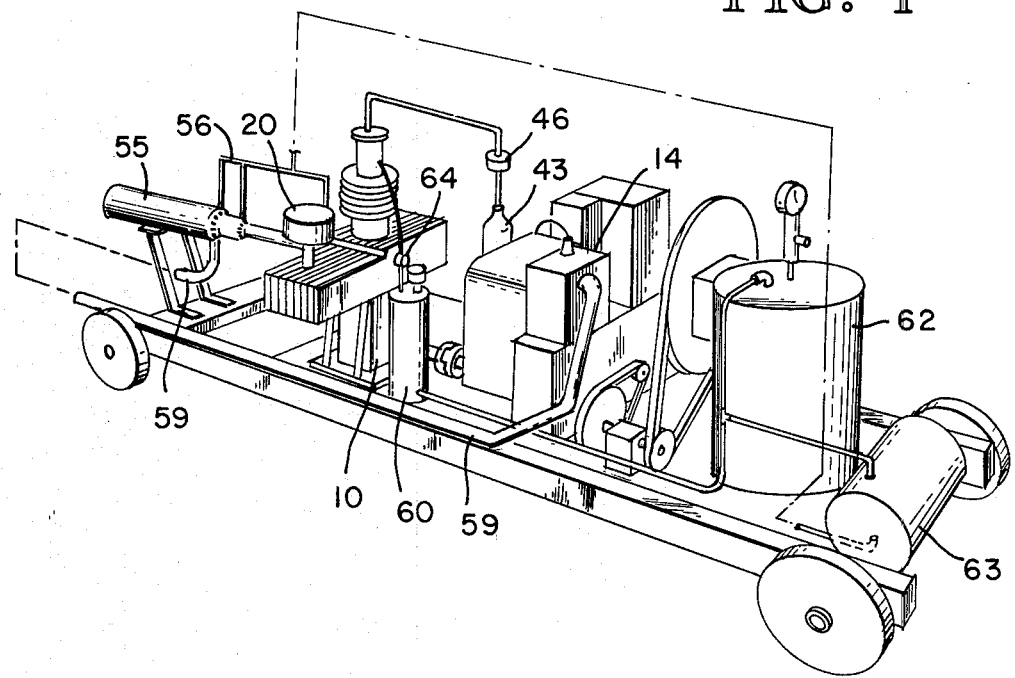
FIG. 1 is a perspective of a motive power system embodying the principles of the invention.
Figure 2:
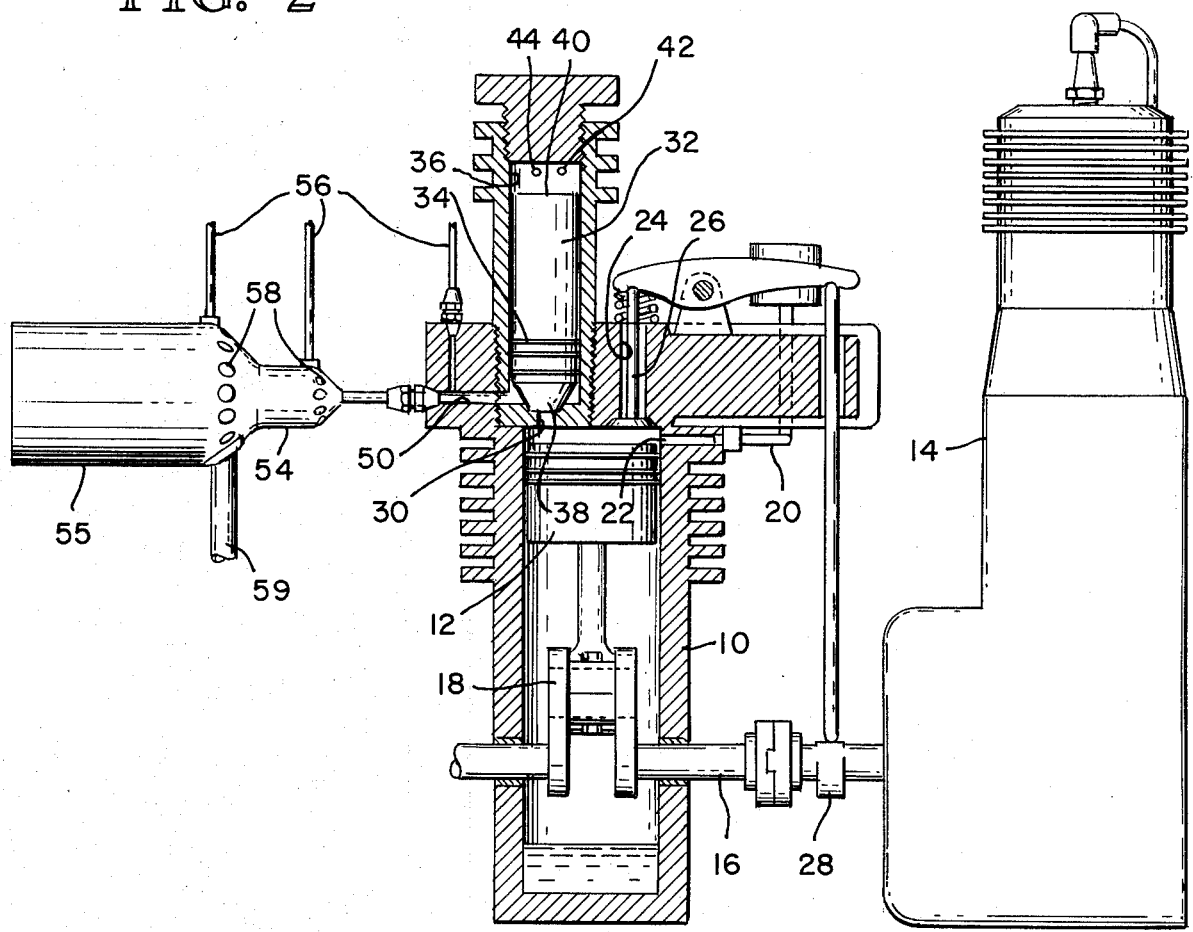
FIG. 2 is a fragmentary section of a portion of the motive power system shown in FIG. 1.

As best shown in FIGS. 1 and 2 the apparatus includes a primary cylinder 10 and a primary piston 12. A prime mover such as a gasoline engine 14 is coupled to the piston 12 by a shaft 16 and connecting rod cranks 18. Other types of prime movers such as an electric motor will also be sufficient. The prime mover reciprocates the piston 12 within the cylinder 10 in a conventional manner. Fuel is introduced into the cylinder from a fuel injector 20 through a port 22. Air is introduced into the cylinder through a port 24 which is closed by a valve 26 operated from a cam 28 on the shaft 16.

The cylinder is provided with an exhaust port 30 which is closed by a floating exhaust valve piston 32. The valve piston is provided with rings 34 and reciprocates within a chamber 36. The valve 32 has an inner end 38 which seals the port 30 and an outer end 40. An inert pressurized gas enters the chamber 36 through a port 42. The inert gas is provided from a high-pressure tank 43 providing more than enough pressure to handle the compression pressures of most fuels. The pressure of the inert gas admitted into the chamber can be varied by a regulator or other suitable means 46. A lubricating port 44 admits lubricating oil to the sliding piston valve 32.

A second external combustion port 50 joins the chamber 36 adjacent the inner end of the valve 32. A supplementary external fuel inlet line 56 intersects with the port 50. The port 50 connects with a third external combustion chamber 54 which in turn connects with a still larger diameter fourth external combustion chamber 55. Additional fuel lines 56 add fuel to these chambers whereas air ports 58 admit air. An exhaust line 59 from the prime mover 14 also admits exhaust gases to the chamber 55.

Figure 3:
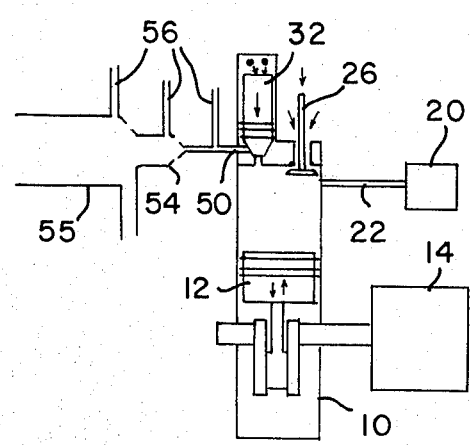
FIGS. 3–7 are operational schematics.
Figure 4:
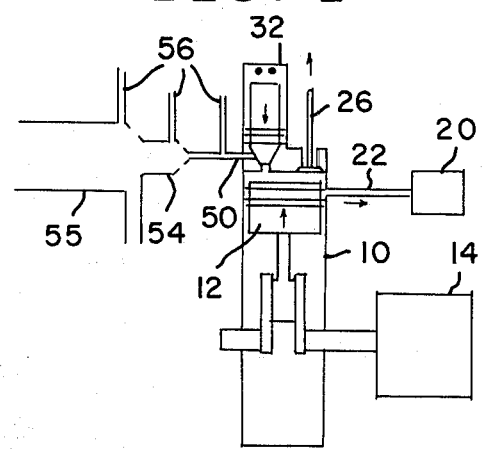
Figure 5:
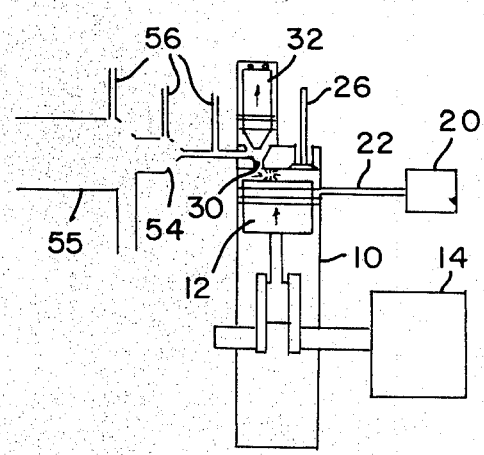

In basic operation the primary piston 12 is reciprocated by the prime mover 14. As the primary piston begins its upstroke as shown in FIG. 3, the air intake valve 26 begins to close. As the piston moves up and just before top dead center, liquid fuel is injected through port 22. In FIG. 4 the piston is at top dead center and the valve 32 is in a lowered closed position. The fuel/air mixture is now fully compressed. In FIG. 5 ignition occurs in the compressed air/fuel mixture and the immediate expansion of the gases increases the pressure to the extent that they overcome the pressure of the inert gas acting on the outer end of the piston 32. The piston 32 is then raised opening the exhaust port 30.

As the exhaust sliding piston valve 32 opens, the ignited and still burning air/fuel mixture exits and enters the port 50 where it is mixed with additional fuel from the fuel port 56. The additional fuel mixes with the hot gases and flame and enters the second post-combustion chamber 54 where additional fuel and air are introduced into the products of combustion and thence into the third combustion area 55. As the products of combustion leave the expansion chamber 55 they are extremely hot, under high pressure and have a very high velocity.

Figure 6:
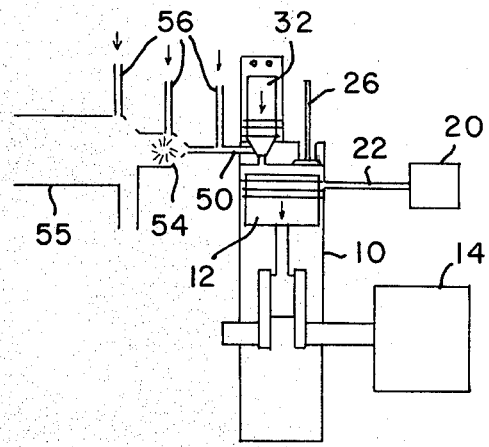
Figure 7:
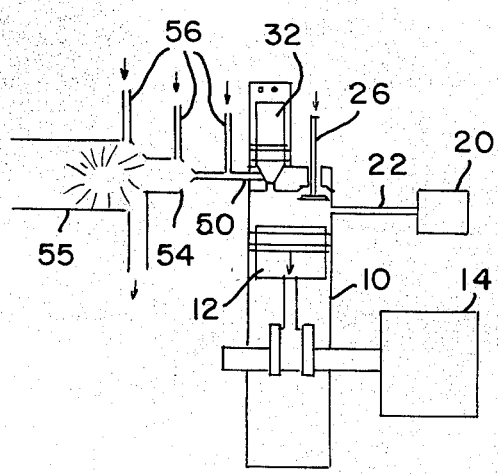
Figure 8:
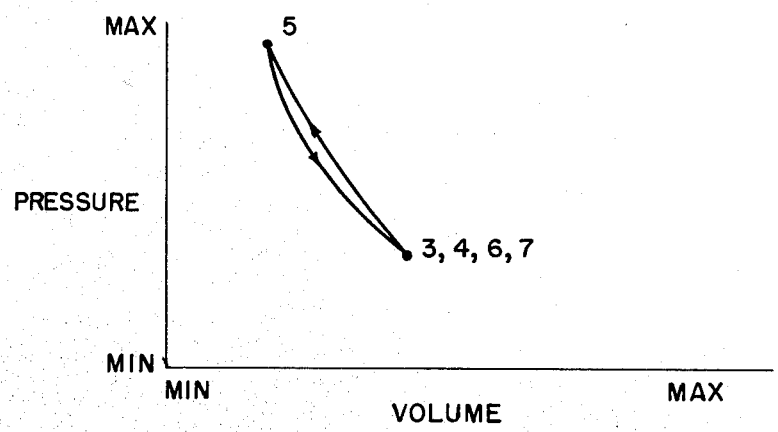
FIGS. 8–10 are approximate, estimated pressure-volume curves at different stages of one operating cycle of the motive system and taken at different locations in the system.

FIG. 8 illustrates a pressure volume relationship in the area of the chamber 36 above the sliding piston 32. The points indicated on the diagram in FIGS. 8-10 correspond to the position of the various components of the system as illustrated in FIGS. 3-7. That is, the pressure above the valve 32 is at a minimum in the position of FIG. 3 (numeral 3 in FIG. 8) with the volume being at a maximum. As the primary piston 12 rises as in FIG. 4, the air/fuel mixture in the cylinder increases thus increasing the pressure on the inner end of the valve piston 32 but the pressure above valve 32 remains constant as indicated by numeral 4 in FIG. 8. The pressure from ignition increases until it overcomes the pressure of the inert gas acting on the outer end of the valve piston 32, the valve piston then moves open as shown in FIG. 5. The pressure above valve 32 then increases as shown by numeral 5 in FIG. 8. This occurs at the instant of ignition of the air/fuel mixture in the chamber 10 so that the burning air/fuel mixture increases the pressure sufficiently to raise the piston valve 32. The still burning gases then leave through the exhaust port 30 and enter into the external ports 50, 54 and 55. A each stage the fuel lines 56 introduce additional fuel which mixes with air and the still burning gases. At this point as shown in FIG. 6 and FIG. 7 the sliding piston valve 32 returns to its seating position, the piston 12 begins to move down, the air inlet valve opens to admit more air and the cycle repeats itself.

Figure 9:
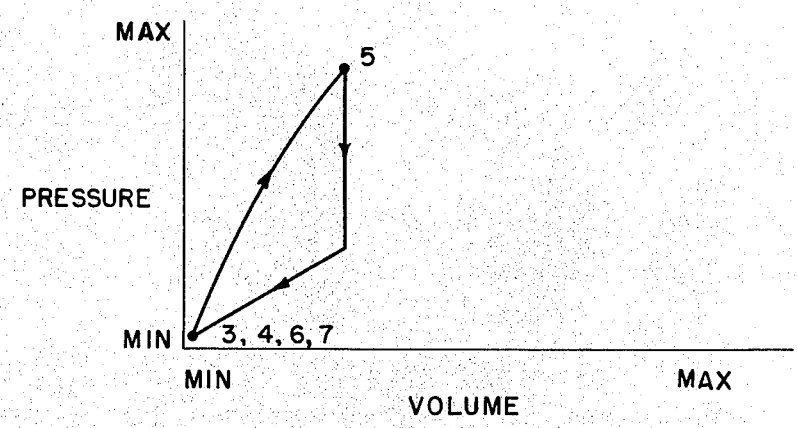

FIG. 9 indicates the volume and pressure below the sliding exhaust valve 32. The points indicated by numerals 3-7 correspond to the pressure volume condition of this area in the positions shown in FIGS. 3-7, respectively.

Figure 10:
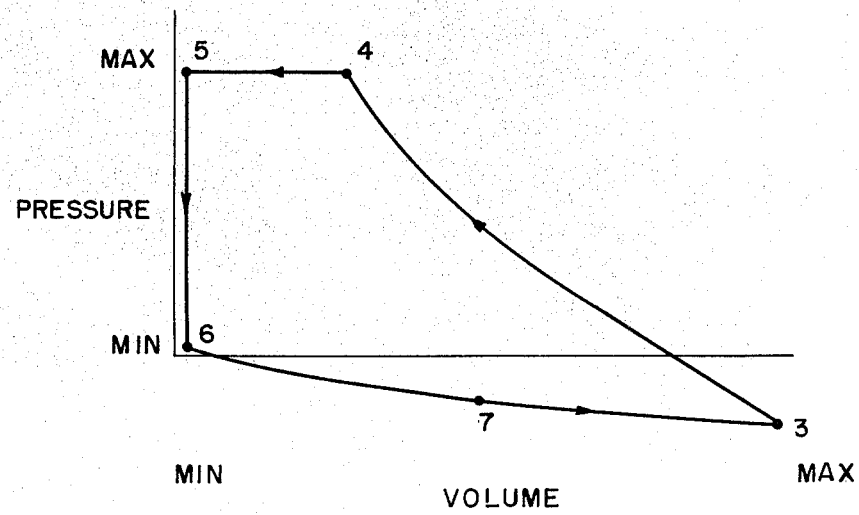

Similarly, FIG. 10 indicates the volume and pressure above the primary piston 12. The numerals 3-7 indicate the pressure and volume condition as shown in FIGS. 3-7, respectively.

The remaining parts of the apparatus are well understood and include a lubricating oiler 60 pressurized by a compressed air tank 62. Tank 62 also can pressurize fuel tank 63 if desired. A valve 64 is provided to regulate the flow of lubricating oil to port 44 to lubricate the floating exhaust valve 32.

While the preferred embodiment of the invention has been illustrated and described, it should be understood that variations will be apparent to one skilled in the art without departing from the principles herein. Accordingly, the invention is not to be limited to the specific embodiment illustrated in the drawings.

What is claimed is:

1. An apparatus for producing a flaming, high-pressure, high-velocity fluid stream, comprising:
    (a) a compressor having a primary piston disposed in a primary cylinder, defining a closed combustion chamber, wherein the piston is capable of reciprocating in the cylinder;
    (b) a prime mover means to reciprocate the piston;
    (c) an air inlet means in the compressor for injecting air into the combustion chamber so that the air is compressed by the piston;
    (d) fuel inlet means in the compressor for injecting fuel into the combustion chamber after the air is compressed, thereby forming an air-fuel mixture in the combustion chamber;
    (e) ignition means to ignite the air-fuel mixture in the combustion chamber;
    (f) an exhaust port communicating with the combustion chamber to remove the ignited air-fuel mixture from the combustion chamber;
    (g) a chamber surrounding the exhaust port and having:
        (i) a floating valve piston capable of reciprocating in the chamber and capable of sealingly seating on the exhaust port;
        (ii) means for applying a pressure to the floating valve piston to ensure that the piston unseats from the port only when a predetermined pressure is achieved in the combustion chamber of the compressor;
        (iii) means for allowing the ignited air-fuel mixture to exit the combustion chamber through the exhaust port and chamber when the piston unseats from the exhaust port; and
    (h) means for adding additional air and fuel to the exiting ignited air-fuel mixture to produce secondary combustion, thereby generating a flaming, high-pressure, high-velocity fluid stream.

2. The apparatus of claim 1 wherein said prime mover means is an internal combustion engine, and the apparatus further comprises means for introducing exhaust gases from said prime mover means to the exiting air-fuel mixture as the additional air and fuel.

3. The apparatus of claim 1, including means for automatically lubricating said valve piston.

4. The apparatus of claim 1 wherein said means for applying pressure to said valve piston includes an inert gas supply communicating with the chamber surrounding the exhaust port, and means for regulating the pressure of the inert gas supplied to the chamber.

5. The apparatus of claim 1 wherein said means for adding additional air and fuel includes a first cylindrical pipe having air inlet holes therein and a fuel line connected thereto, and a second cylindrical pipe having air inlet holes therein and a fuel line connected thereto, said first cylindrical pipe being larger in diameter than said exhaust port, said second cylindrical pipe being larger in diameter than said first cylindrical pipe.

6. In a system having at least one primary piston and one primary cylinder, defining a combustion-compression chamber, air inlet means and fuel inlet means into the chamber, ignition means to ignite the air-fuel mixture in the chamber, and an exhaust port to allow ignited gases to exit from the combustion chamber, the improvement comprising:
    (a) a second chamber attached to the system;
    (b) a port connecting the second chamber with the combustion-compression chamber of the system;

(c) a floating valve piston disposed in the second chamber, capable of reciprocating in the second chamber, and capable of sealing the port when seated thereon; and
(d) means to apply a pressure to the floating piston so that the floating piston remains seated on the port until a predetermined pressure is achieved in the combustion chamber.

* * * * *